United States Patent
Jha et al.

(10) Patent No.: US 8,639,833 B1
(45) Date of Patent: Jan. 28, 2014

(54) DYNAMIC CONTROL OF SCALING IN COMPUTING DEVICES

(75) Inventors: Ashutosh K. Jha, Sunnyvale, CA (US); Sameer Nanda, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 999 days.

(21) Appl. No.: 11/539,581

(22) Filed: Oct. 6, 2006

(51) Int. Cl.
  *G06F 15/16* (2006.01)
  *G06F 15/167* (2006.01)
  *G06F 15/173* (2006.01)

(52) U.S. Cl.
  USPC ............ 709/232; 709/212; 709/236; 709/238

(58) Field of Classification Search
  USPC ........................................................ 709/232
  See application file for complete search history.

(56) References Cited

U.S. PATENT DOCUMENTS

| | | | | |
|---|---|---|---|---|
| 2004/0100984 | A1* | 5/2004 | Nam et al. | 370/438 |
| 2004/0141494 | A1* | 7/2004 | Beshai et al. | 370/352 |
| 2004/0199370 | A1* | 10/2004 | Arama et al. | 703/20 |
| 2006/0018329 | A1* | 1/2006 | Nielsen et al. | 370/401 |
| 2006/0153215 | A1* | 7/2006 | Cornett et al. | 370/412 |
| 2006/0235992 | A1* | 10/2006 | Matias et al. | 709/236 |
| 2007/0005920 | A1* | 1/2007 | Bacon et al. | 711/163 |
| 2007/0088873 | A1* | 4/2007 | Oshikiri et al. | 710/58 |
| 2007/0121504 | A1* | 5/2007 | Hellenthal et al. | 370/230 |
| 2008/0002724 | A1* | 1/2008 | Grewal et al. | 370/401 |
| 2008/0005258 | A1* | 1/2008 | Sridharan et al. | 709/212 |
| 2008/0005352 | A1* | 1/2008 | Goglin et al. | 709/238 |
| 2008/0022388 | A1* | 1/2008 | Grewal et al. | 726/13 |
| 2008/0043617 | A1* | 2/2008 | Schekochikhin et al. | 370/229 |
| 2008/0077792 | A1* | 3/2008 | Mann | 713/160 |
| 2008/0095247 | A1* | 4/2008 | Ohno et al. | 375/240.28 |
| 2009/0232012 | A1* | 9/2009 | Zseby | 370/252 |

OTHER PUBLICATIONS

Microsoft, Scalable Networking: Eliminating the Receive Processing Bottleneck—Introducing RSS, Apr. 14, 2004, pp. 1-17.*
Microsoft "Scalable Networking: Eliminating the Receive Processing Bottleneck—Introducing RSS" http://www.Microsoft.com/whdc WinHec 2004 Version—Apr. 14, 2004, pp. 1-17.

* cited by examiner

*Primary Examiner* — Richard G Keehn
(74) *Attorney, Agent, or Firm* — Patterson + Sheridan, L.L.P.

(57) ABSTRACT

A method and system for dynamically controlling scaling in a computing device is disclosed. Specifically, in one embodiment, the system information of the computing device is collected and is compared with a trigger condition to generate a comparison result. According to the comparison result, the distribution of a processing task to handle network traffic received by the computing device to at least one designated processing unit in this computing device is either enabled or disabled.

3 Claims, 4 Drawing Sheets

DYNAMIC CONTROL OF SCALING IN COMPUTING DEVICES

BACKGROUND OF THE INVENTION

1. Field of the Invention

Embodiments of the present invention relate generally to multiprocessor systems and more specifically to dynamic control of scaling in computing devices.

2. Description of the Related Art

Unless otherwise indicated herein, the approaches described in this section are not prior art to the claims in this application and are not admitted to be prior art by inclusion in this section.

Multiprocessor systems have become increasingly common to handle the ever increasing amount of network traffic. To efficiently utilize the processing capabilities of the multiple processors, the operating systems for these systems need to intelligently distribute the work load. One approach is the use of receive-side scaling ("RSS") technology, which enables packet receive-processing to scale with the number of available processors. To illustrate, FIG. 1A is a simplified block diagram of a computing device, 100, in which the RSS technology can be implemented. Specifically, computing device 100 includes multiple processing units 111, such as processing units 1, 2, and n. The n processing units share network adapter 104 via high speed I/O bridge 102 and execute certain interrupt service routines ("ISRs") and deferred procedure calls ("DPCs") to support the RSS technology. The operating system of computing device 100 schedules the execution of the ISRs and the DPCs and provides a network protocol stack and a network driver interface for network adapter 104. Some other aspects of the RSS technology are performed by network adapter 104.

FIG. 1B is a simplified flow diagram illustrating the RSS technology mainly from the perspective of network adapter 104. Network adapter 104 receives packets from the network in step 150. Before issuing any interrupt, network adapter 104 computes a signature for each packet using a hash function and transfers a receiver descriptor and packet contents to system memory 106 in step 152. A receiver descriptor generally includes the signature and also the information facilitating the communication between network adapter 104 and the operating system. It should also be noted that the aforementioned signature is used for load balancing across the multiple processing units in computing device 100. Then, in step 154, network adapter 104 issues the interrupt to the operating system, causing the ISR to execute. The ISR then schedules the DPC to execute on a designated processing unit based on the signature of the packets received by network adapter 104. Generally, the same default processing unit executes all the ISRs. The ISR instructs network adapter 104 to disable interrupts in step 156; in other words, even if network adapter 104 receives additional packets, it does not issue interrupts. However, to address the potential lag between the ISR execution and the DPC execution, the receiver descriptors associated with the received packets generally are queued. If the DPC completes processing of the receiver descriptors that have been queued, or if a certain period of time has lapsed in step 158, then the DPC reenables the interrupts for network adapter 104 in step 160.

The deployment of the RSS technology involves a certain amount of overhead, such as the aforementioned signature generation and the processing of the ISRs and the DPCs, to enable load balancing across the different processing units. The cost of this overhead can be justified in two scenarios: 1) when there is considerable amount of packet processing work to be shared among the multiple processing units; and 2) when at least one processing unit is being over-utilized. In other words, if the traffic on the network is light or if all the processing units in computing device 100 are underutilized, then the benefits of load balancing offered by the RSS technology are reduced such that they do not outweigh the cost of the associated overhead. There, in low traffic situations, automatically implementing RSS technology negatively impacts the overall performance of computing device 100.

As the foregoing illustrates, what is needed in the art is a technique for dynamically controlling of scaling in computing devices to optimize the overall performance of these systems.

SUMMARY OF THE INVENTION

A method and system for dynamically controlling scaling in a computing device is disclosed. Specifically, in one embodiment, the system information of the computing device is collected and is compared with a trigger condition to generate a comparison result. According to the comparison result, the distribution of a processing task to handle network traffic received by the computing device to at least one designated processing unit in this computing device is either enabled or disable.

One advantage of the disclosed method and system is that it dynamically controls whether to enable the RSS technology according to some trigger conditions; as a result, any potentially negative performance impact cause by administering the RSS technology under certain circumstances can be avoided.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A method and system for dynamically controlling scaling in a computing device is described. In the following description, for the purposes of explanation, numerous specific details are set forth in order to provide a thorough understanding of the present invention. It will be apparent, however, to one skilled in the art that the present invention may be practiced without these specific details.

Throughout this disclosure, when a processing unit is said to operate in "kernel mode," it executes trusted software and thus can execute any instructions and reference any memory addresses in that system. Otherwise, the processing unit operates in "user mode," where the execution of user mode software may need accesses to privileged instructions by making system calls to the kernel. The term "scaling" is used interchangeably with the term "load balancing," both referring to the distribution of work to multiple processing units in a system so that the overall performance of the system can be upwardly scaled. Also, some examples of the "computer-readable medium" referred to herein include, without limitation, non-volatile media (e.g., optical or magnetic disks) and volatile media (e.g., dynamic memory).

Figure 1A:
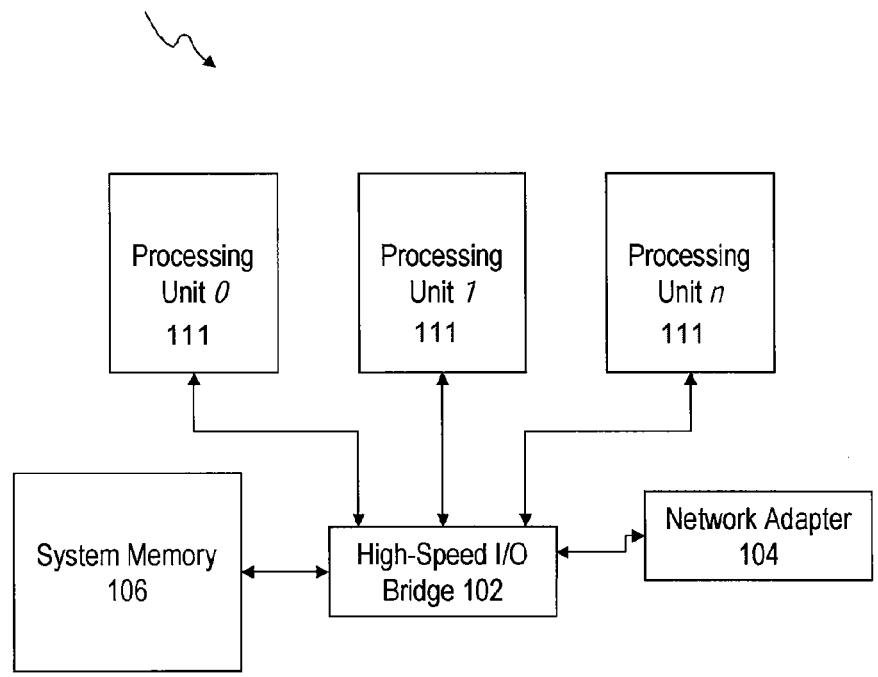
FIG. 1A a simplified block diagram of a computing device, in which the RSS technology can be implemented.
Figure 1B:
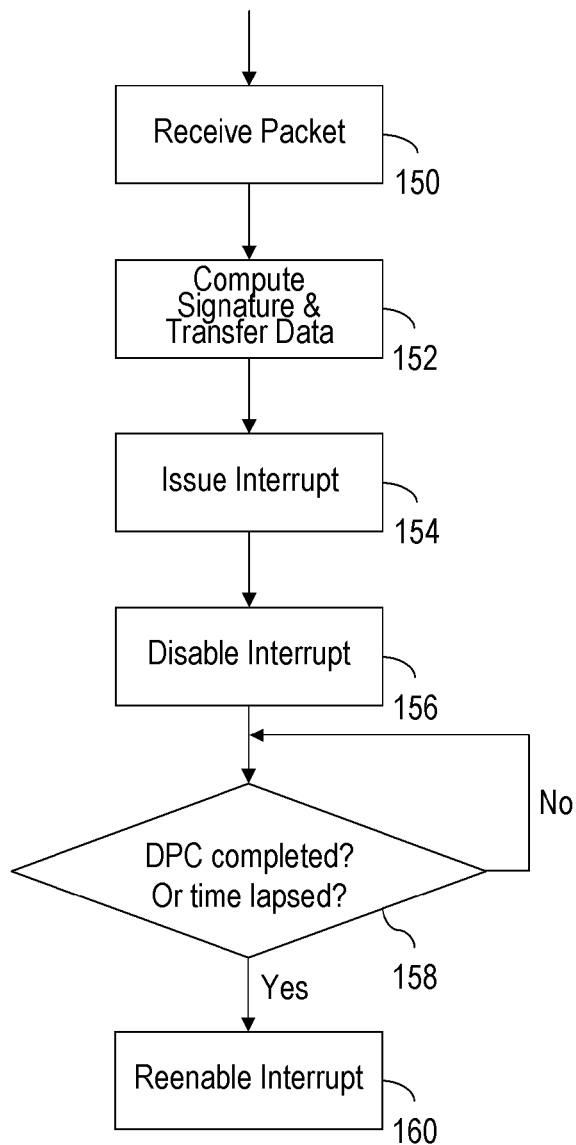
FIG. 1B is a simplified flow diagram illustrating the RSS technology mainly from the perspective of a network adapter.
Figure 2:
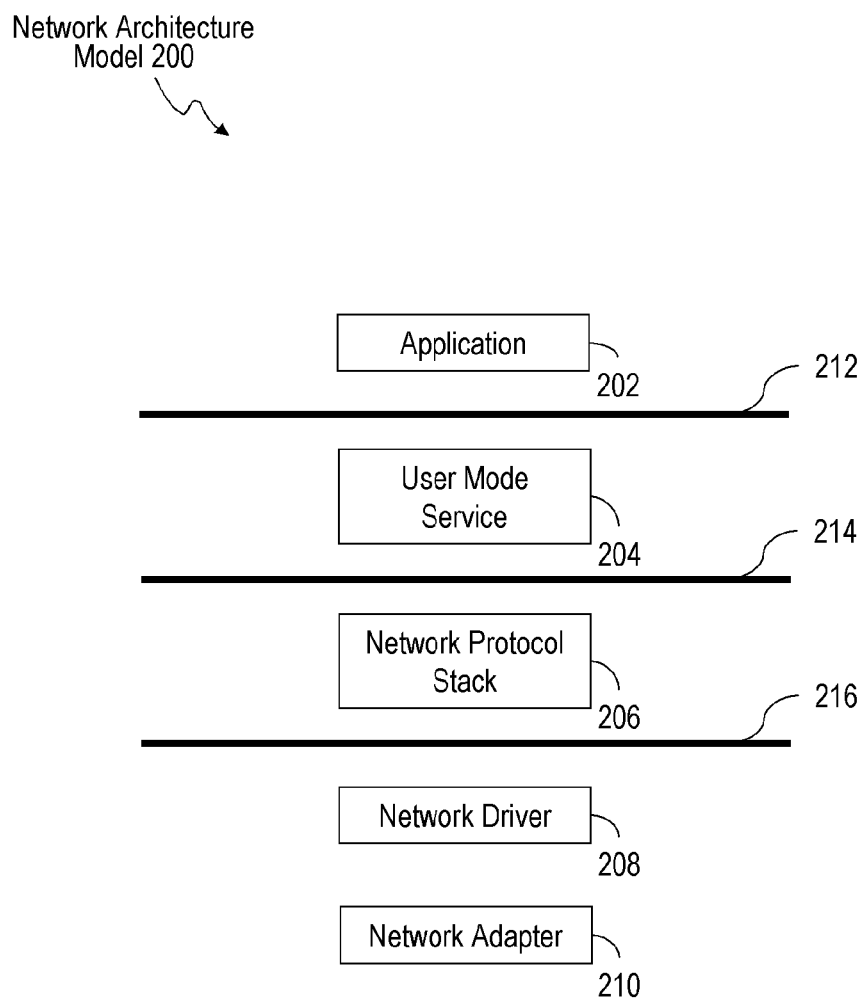
FIG. 2 is a simplified network architecture model, adopted by a computing device, according to one embodiment of the present invention.

FIG. 2 is a simplified network architecture model, 200, adopted by computing device 100, according to one embodiment of the present invention. Specifically, network architecture model 200 includes an application 202, a user mode service 204, a network protocol stack 206, a network driver 208, and a network adapter, such as network adapter 104 shown in FIG. 1A. In addition, application 202 and user mode service 204 are separated by application interface 212; user mode service 204 and network protocol stack 206 are separated by system interface 214; and network protocol stack 206 and network driver 208 are separated by driver interface 216. Other than network adapter 104, all the components shown in network architecture model 200 maybe implemented in software. Typically, the software components 204 and 206 and interfaces 212, 214, and 216 are part of the operating system of computing device 100. For example, if the operating system is the Microsoft Windows, then an example of user mode service 204 may be the Windows Sockets, and network protocol stack 206 may be further include a Transmission Control Protocol ("TCP") component, an Internet Protocol ("IP") component, and a traffic control component. Also, system interface 214 facilitates exchanges between user mode software and kernel mode software, and driver interface 216 adheres to Network Driver Interface Specification ("NDIS"). However, it should be emphasized that the scope of the claimed invention is not limited to the Microsoft Windows operating system.

Figure 3:
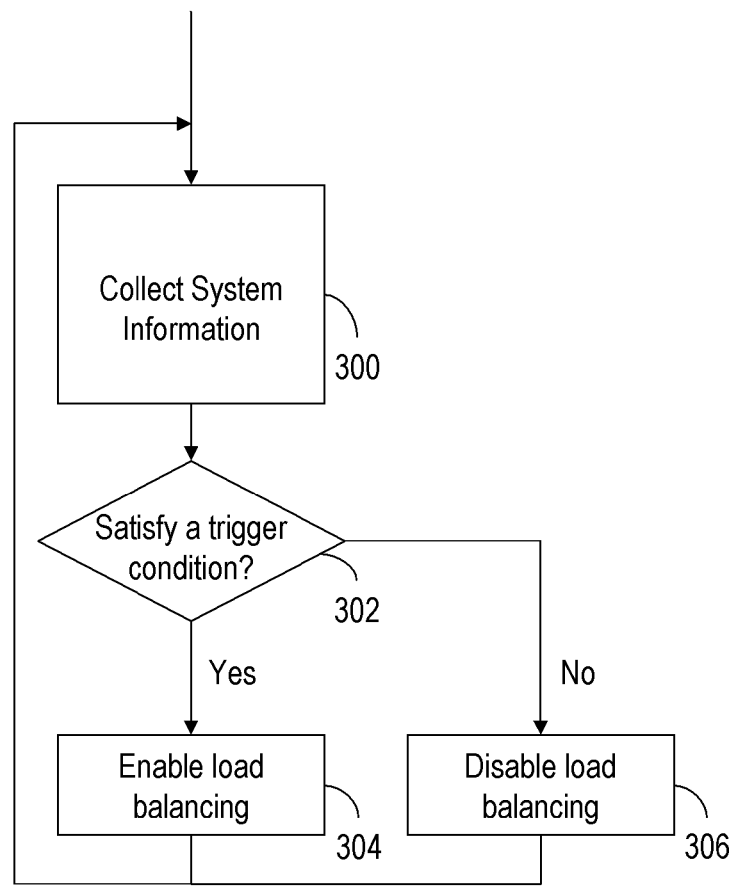
FIG. 3 is a flow diagram of method steps for dynamically enabling or disabling load balancing in a computing device, according to one embodiment of the present invention.

FIG. 3 is a flow diagram illustrating one process of dynamically enabling or disabling load balancing in computing device 100, according to one embodiment of the present invention. Specifically, in step 300, network driver 208 shown in FIG. 2 collects system information, such as, without limitation, the network traffic load from network adapter 104 and the utilization levels of the processing units from the operating system. If the collected system information satisfies at least one trigger condition in step 302, then the load balancing functionality (e.g., the RSS technology) is enabled for computing device 100 in step 304; otherwise, the load balancing functionality is disabled in step 306. This process continues as long as computing device 100 is in operation. Alternatively, the steps may be repeated at a configurable interval.

As an illustration, suppose one trigger condition is for network adapter 104 to receive at least four times as many small packets as large packets from the network. Suppose also that the load balancing functionality is provided by the RSS technology. A small packet here contains less than 512 bytes of payload data, and a large packet contains at least 512 bytes of payload data. Under this condition, distributing the tasks of retrieving and processing the control information stored in each of the unproportionally large number of small packets to multiple processing units would likely improve the effective throughput of computing device 100. Thus, the load balancing functionality (e.g., the RSS technology) would be enabled. It is worth noting that network adapter 104 and the operating system for computing device 100 track the size of each packet traveling upstream and downstream, respectively. On the other hand, continuing with this illustration, if the ratio between the number of the small packets and the number of the large packets is less than 4, then the RSS technology is disabled. Specifically, network adapter 104 in this case does not compute the signature using the hash function, and the operating system does not attempt to utilize the signature to designate processing units to perform certain tasks. As a result, the overhead of administering the RSS technology as discussed above is minimized.

Another trigger condition is related to the rate of receiving packets from the network by network adapter 104. If the rate reaches a threshold level indicating the insufficiency of one processing unit in computing device 100 to handle the incoming traffic, then distributing the processing of these incoming packets to the various processing units in the system would improve the overall throughput. In one implementation, network driver 208 maintains the threshold level and compares the rate, which is computed by network adapter 104, to the threshold level from time to time. On the other hand, in yet another trigger condition, the overall utilization of the processing units in computing device 100 indicates being almost idle suggesting that a single processing unit can handle all the network traffic. Under this condition, the load balancing functionality (e.g., RSS technology) would be disabled. In one implementation, the operating system for computing device 100 tracks the utilization levels of the processing units and maintains a configurable threshold level for disabling RSS technology.

Although individual trigger conditions have been described, multiple trigger conditions may be utilized in combination to formulate the decision to enable or disable the load balancing functionality. For example, whether to enable the RSS technology may depend on the satisfaction of two trigger conditions: detecting the over-utilization of at least one processing unit in computing device 100 and also observing the receipt of at least 4 times as many small packets as large packets by network adapter 104. It should be apparent to a person with ordinary skills in the art to recognize that the specific implementation details discussed above are for illustration purposes only and should be not be construed to limit the scope of the claimed invention.

The above description illustrates various embodiments of the present invention along with examples of how aspects of the present invention may be implemented. Although one embodiment of dynamically enabling or disabling the load balancing functionality is implemented in network driver 208, it should be apparent to a person skilled in the art to implement some of the steps shown in FIG. 3 in network adapter 104 (e.g., whether a certain trigger condition is met). The above examples, embodiments, and drawings should not be deemed to be the only embodiments, and are presented to illustrate the flexibility and advantages of the present invention as defined by the following claims.

We claim:

1. A method of controlling dynamic scaling in a computing device, the method comprising:
 collecting system information associated with a network adapter within the computing device via a network driver that operates in a kernel mode;
 comparing the collected system information with a trigger condition;
 wherein the trigger condition comprises tabulating a ratio based on the number of packets of a first packet size and the number of packets of a second packet size received by a network adapter of the computing device, wherein the first packet size does not equal the second packet size;

wherein the network driver enables receive-side scaling technology to manage the distribution of network traffic received by the computing device to a plurality of processing units if the trigger condition is satisfied, or disables the receive-side scaling technology if the trigger condition is not satisfied; and notifying an operating system of the computing device and the network adaptor within the computing device regarding whether to enable the receive-side scaling technology.

2. A hardware computing device, comprising:

a plurality of processing units, and a network adapter associated with a network driver, wherein the network driver operates in a kernel mode and is configured to:

collect system information associated with the network adapter;

compare the collected system information with a trigger condition;

wherein the trigger condition comprises tabulating a ratio based on the number of packets of a first packet size and the number of packets of a second packet size received by the network adapter, wherein the first packet size does not equal the second packet size; and wherein the network driver enables receive-side scaling technology to manage the distribution of network traffic received by the computing device to the plurality of processing units if the trigger condition is satisfied, or disables the receive-side scaling technology if the trigger condition is not satisfied; and wherein the network driver notifies an operating system of the computing device and the network adaptor whether to enable the receive-side scaling technology.

3. A non-transitory computer-readable medium containing a sequence of instructions, which when executed by a processing unit in a computing device, causes the computing device to control the dynamic scaling of a processing task by performing the steps of:

collecting system information associated with a network adapter within the computing device via a network driver operating in kernel mode;

comparing the collected system information with a trigger condition;

wherein the trigger condition comprises tabulating a ratio based on the number of packets of a first packet size and the number of packets of a second packet size received by the network adapter, wherein the first packet size does not equal the second packet size; and wherein the network driver enables receive-side scaling technology to manage the distribution of network traffic received by the computing device to a plurality of processing units if the trigger condition is satisfied, or disables the receive-side scaling technology if the trigger condition is not satisfied; and notifying an operating system of the computing device and the network adaptor within the computing device regarding whether to enable the receive-side scaling technology.

* * * * *

UNITED STATES PATENT AND TRADEMARK OFFICE
CERTIFICATE OF CORRECTION

PATENT NO.       : 8,639,833 B1
APPLICATION NO.  : 11/539581
DATED            : January 28, 2014
INVENTOR(S)      : Jha et al.

Page 1 of 1

It is certified that error appears in the above-identified patent and that said Letters Patent is hereby corrected as shown below:

In the Claims:

Column 5, Claim 2, Line 24, please delete "and";

Column 6, Claim 3, Line 18, please delete "and".

Signed and Sealed this
Twenty-second Day of April, 2014

Michelle K. Lee
*Deputy Director of the United States Patent and Trademark Office*